United States Patent [19]

Alvarez-Calderon

[11] 3,949,956
[45] Apr. 13, 1976

[54] PARAMETRICALLY SHAPED LEADING EDGE FLAPS

[76] Inventor: Alberto Alvarez-Calderon, Avenida Salaverry 3465, Orrantia del Mar, Lima, Peru

[22] Filed: Feb. 11, 1974

[21] Appl. No.: 441,331

Related U.S. Application Data

[62] Division of Ser. No. 377,621, July 9, 1973, Pat. No. 3,897,029.

[52] U.S. Cl. ........................ 244/42 CA; 244/42 DB
[51] Int. Cl.² ...................... B64C 3/50; B64C 9/28
[58] Field of Search ......... 244/42 CA, 42 CB, 42 D, 244/42 DB, 42 DA, 42 R, 44

[56] References Cited
UNITED STATES PATENTS

| | | | |
|---|---|---|---|
| 3,126,173 | 3/1964 | Alvarez-Calderon | 244/42 DB |
| 3,246,335 | 4/1966 | Alvarez-Calderon | 244/42 R |
| 3,371,888 | 3/1968 | Alvarez-Calderon | 244/42 DB |
| 3,447,761 | 6/1969 | Whitener et al. | 244/42 D X |
| 3,556,439 | 1/1971 | Autry et al. | 249/42 D |
| 3,638,886 | 2/1972 | Zimmer | 244/42 D |

*Primary Examiner*—Trygve M. Blix
*Assistant Examiner*—Barry L. Kelmachter

[57] ABSTRACT

An airfoil is specified with a double slotted leading edge flap having two members and adapted to be used together with a multi-slotted trailing edge flap. The leading edge flap uses two slots for landing and one or no slots for take off. The front leading edge flap member has specific shape parameters and curvatures. The rear leading edge member defines a slot substantially downstream of the cruise leading edge. Ahead of the trailing edge flap slot, there is provided a special slot across the wing's surface in special cooperation with a spoiler. The airfoil surface between the downstream slot of the leading edge flap and the special slot near the trailing edge flap is short and with negligible camber. Special consideration is given to wing torsion, fuel volume, number of slots, and effect of varying airfoil thickness on flap geometric and aerodynamic parameters.

7 Claims, 12 Drawing Figures

PARAMETRICALLY SHAPED LEADING EDGE FLAPS

RELATED APPLICATIONS

This application is a division of my co-pending application Ser. No. 377,621, filed July 9, 1973, now U.S. Pat. No. 3,897,029.

DESCRIPTION OF PRIOR ART

In my U.S. Pat. Nos. 3,264,335, 3,375,998, 3,481,561 and others, I have reviewed in great extent the aerodynamic, mechanical, and structural problems encountered on the design of various leading edge devices for wings capable of flight at high speeds which are yet required to develop very high lift coefficients in landing and take-off. These will not be reviewed here again.

In those patents I have presented single and multi-slotted leading edge flaps, some with variable camber features, and I have taught also basic shapes and proportions which should govern the design of variable camber leading edge flaps having articulated folding in their nose portions.

I have continued my investigations on leading edge shapes taking into account local speed and pressures at very high lift coefficients, including the derivative $DP/DS$, where P is a local pressure along upper surface S; $DV/DS$ where V is a local speed at point S. I have further considered speed distribution effect on the energy content in the boundary layer along upper surface S, and the relation of this content to the flow turning ability as it relates to curvature distributions as pertinent to take-off and landing, inclusive lift to drag ratio.

Moreover I have examined these problems for various airfoil thickness ratios, and I have come to certain unique specific aerodynamic criteria of shapes and proportions, which are adapted to mate into well known airfoil sections by means of structurally and mechanically simple devices employing some of the teachings of my aforementioned U.S. patents. The teachings of the present patent will become evident in the descriptions contained in the specifications, and in the drawings.

In order to better understand some of the teachings of this present invention, it should be realized that in conventional area increasing flaps, such as the Handley Page leading edge flap and a full Fowler Flap, slots are provided, located one at the leading and one at the trailing edge of the basic airfoil, respectively. There is attained maximum area increment. However, this full area increment leaves the entire upper surface of the basic airfoil with a full chord length, the flow on top of which is not supported or improved by any high speed slot flows located between its leading and trailing edges. Furthermore the upper surface in its chord length is relatively highly cambered, because it includes the curved leading and trailing edge portions of the basic airfoil or wing. Thus, the boundary layer on top of the wing encounters large adverse pressure gradient and very long distances on which its energy content decays, leading to flow separations from the wing's upper surface even if the local surface flows on the leading and trailing edge devices is attached. This adverse phenomena is aggravated with sweep. The solution to these and other problems become evident in the teachings of my present invention, the main purposes of which are specified in the following summary.

SUMMARY OF THE INVENTION

The present invention follows my investigations of the rate and change of speed and pressures along the upper surfaces of the flaps and wings, and considers the effects which these variables have on boundary layer energy content, flow turning ability, and lift to drag ratio contributions of flaps as dependent on chord and shapes of flaps and slots, chord and shape of a wing, and slot location.

In an embodiment of my invention, while I retain the full chord area increment of leading and trailing edge devices, I nevertheless succeed in specifying practical additional flap or spoiler structures which provide special slots located away from and between the leading and trailing edges of the wing, to reenergize the boundary layer on top of the wing such as to improve, and support, attached flows to angles of attack larger than usual. One beneficial effect is the straightening out of the usual decrease of slope of lift curve near maximum lift thereby attaining more lift for a given angle of attack. Another beneficial effect is the extension of the lift curve thus attaining more lift by increasing angle of attack to a larger value than before. A third benefit is the elimination of leading edge type of stall even with swept wings, thereby improving lateral and pitch characteristics near the stall. All this is attained with nor­mal location of front and rear spars of wings, without penal­izing or interrupting the torsion box between these spars, and without penalities to fuel volume.

One purpose of my invention is to define a double slotted leading edge flap the downstream slot of which is located as far to the rear as possible on the wing, compatible with maximum chord increment of the flap to the wing and compatible with a practical wing front spar location, in order to minimize the length of flow along the upper surface of the wing which is without the benefits of the flow reenergizing function of a slot.

Another purpose of my invention is to provide, in combination with my double slotted leading edge flap, a trailing edge multi-slotted flap with an upstream slot as close as possible to the downstream slot of my leading edge flaps, but compatible with a maximum chord extension to the wing by the trailing flap, and compatible with a normal or rational rear spar location on the wing.

Another purpose of the invention is to restrict the curvature a flapped high lift airfoil principally to the deployed flapped portions, which have either a very thin boundary layer beginning with at near zero thickness at the stagnation point, or alternatively have a flow reenergizing slot in the close vicinity of the curved regions. Consequently a stringent restriction for curvatures can be placed on the wing's upper surface between the downstream slot of my double slotted leading edge flap and the upstream slot of a trailing edge flap, which, it should be noted, has a greatly decreased chordal length as well due to my special slot locations.

Another purpose of the invention is to define the type of curvatures along the upper surface of the front flap of a double slotted leading edge flap, to permit minimum local speeds of economy of energy losses, but compatible with simple structures which have to mate retracted into conventional airfoils with a forward front spar location.

Another purpose of the invention is to establish the locus of centers of curvature representative of useful descriptions of the curvatures of the principal portions of the upper surface of the front flap of a double slotted leading edge flap, in order to provide not too severe variations of pressures along its upper surface S, and to minimize the effect of inertia properties of fluid particles.

Another purpose of the invention is to establish the relative size of the first and second flaps of a double slotted leading flap, having in mind the aforesaid considerations.

Another purpose of the invention is to define combinations of double slotted leading edge flaps with multi-slotted trailing edge flaps, inclusive the way to place these in the take-off and landing position, taking into account lift to drag ratio as influenced by local speed distributions on a flapped airfoil and number of slots.

Another purpose of the invention is to eliminate or delay a violent type of leading edge wing stall, forcing a gradual stall, or a stall originating in progressive trailing edge flow separation.

Another purpose of the invention is to eliminate usual lift decay at large angles of attack; therefore improving lift for a given angle of attack, and increasing lift by improving the angle of attack range prior to stall.

Another purpose of the invention is to provide double slotted leading edge flaps on swept wings to improve lift, lateral characteristics, and pitch characteristics.

Another purpose of the invention is to control spanwise lift distribution at large angles of attack for swept and unswept wings by employing leading edge devices having varying number of slots along its span, for example two slots in the outboard regions of a swept wing, and one or no slots in the inboard regions of the wing.

Another purpose of the invention is to define a wing structure having practical spar locations, torsional rigidy and availibity of volume for fuel, and yet having, nevertheless, relatively large area increasing flap leading and trailing edge flaps outside the fuel volume and structural regions.

Yet another purpose of the invention is to define combinations of inverting trailing and leading edge flaps which include special cooperation of their actuator pressures and their respective flap loads.

BRIEF DESCRIPTION OF DRAWINGS

The drawings diagramatically illustrate by way of example, and not by way of limitation, forms of the invention wherein reference numerals designate corresponding parts in several views in which.

DESCRIPTION OF THE PREFERRED ENBODIMENTS

In this invention I set forth the basic and specific configurations, proportions, shapes and specific geometric and aerodynamic parameters which result from my investigations.

My invention is not limited in its application to the individual drawings and descriptions, since the invention is capable of other enbodiments and of being practiced in various other ways.

Figure 1:
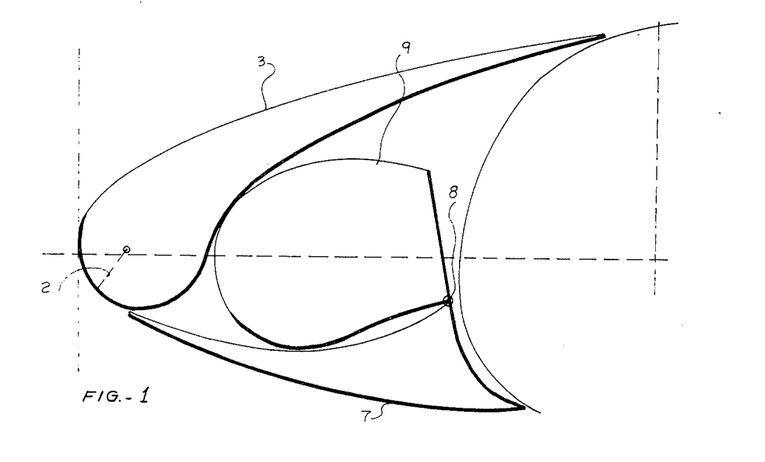
FIGS. 1 and 2 show, on the nose of a relatively thick airfoil, a sectional view of double slotted leading edge flap in the retracted, and in the double slotted landing positions, respectively.

FIG. 1 shows the nose portion 1 of an 18% thick airfoil on which there is installed retracted my double slotted leading edge flap or auxiliary airfoil. Its upper member 3 is shown hinged at axis 5 forming an upper surface leading portion to the basic or primary airfoil. It should be observed that hinge 5 in this embodiment is actually within a circle defined by wing leading edge radius 2 having a radius of curvature or dimension of about 1.8% of the chord of the basic airfoil or wing. Lower flap member 7 is also hinged at 5 in this enbodiment, although a different axis could be used. Flap member 7 has a folding nose piece 9 of exceptionally large dimension having a crossectional area larger than that of 7. Nose 9 is folded on top of 7 hinged at 8. Member 7 forms a lower leading surface portion to the basic airfoil. It should be carefully noted how wing spar 11 is located at approximately 19% of the chord of the primary airfoil, leaving very considerable volume 13 to house actuators and controls which are shown schematically as 15. It should also be observed that only small space 17 is left unused within the contours of the airfoil's nose.

Figures 2, 6, 12:
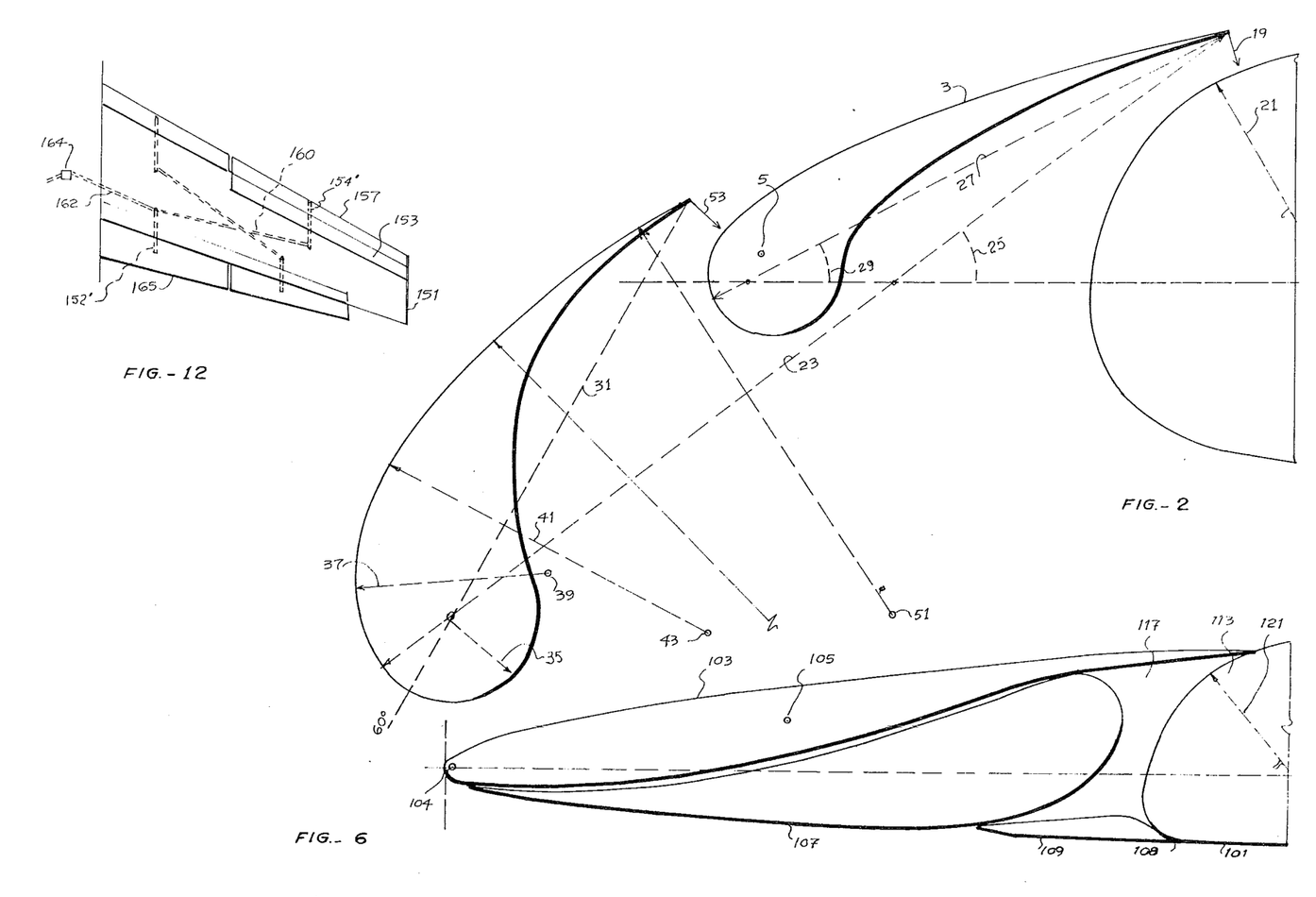
FIGS. 6 and 7 show on the nose of a thin airfoil a sectional view of my double slotted leading edge flap in retracted and in the double slotted landing positions.
FIG. 11 and 12 show aspects of FIG. 10 and 9 respectively.

FIG. 2 shows the structure of FIG. 1 deployed in a landing configuration. Upper member 3 is raised upwardly about hinge 5 by a small amount to open a downstream slot 19 at approximately 18% chord of the basic or primary airfoil, with the trailing edge of 3 spaced from the front upper surface of 1. Note that the rearward slot wall adjacent the slot mouth has a curvature the radius of curvature of which increases, in the downstream direction continuously until it blends with the wing's upper surface contour. A radius of curvature in the region described, which is not to be taken as representative of the variable and increasing radius, but as a value for a surface portion adjacent the slot's mouth and ahead of it, is shown as 21 and it is approximately 6.5% of wing's chord or about ⅓ of its thickness. The radius as shown is inclined at about 30° from the vertical. The convergence ratio of the downstream slot is excellent and by inspection, in the order of 6 to 1. Note that member 3 which has a chord of approximately 19% of the primary airfoil's chord does not increase the camber and chord of the basic airfoil.

Lower member 7 is shown in FIG. 2 deployed inverted with respect to its retracted position and having an overall chord of approximately 20% of the primary airfoil's chord, which acts to extend the camber and chord of the primary airfoil. Nose 9 is also inverted with respect to member 7, placed unfolded extending the camber and chord of member 7.

My extended slotted leading edge flap has, by inspection, an aerodynamically effective rectilinear chord 23 about 36% of the chord of the basic airfoil, extending between leading edge of 9 and trailing edge of 3 at slot, and inclined at an angle 25 of about 37° to the chord of the basic airfoil.

The upper member 3 has a chord 27 of about 20% of the airfoil's chord and is inclined at an angle 29 of about 28°. The upper surface contours of 3 and its leading edge radius conforms to that of the basic airfoil.

Lower members 7 and 9 have a chord 31 of about 20% of the basic airfoil's chord, inclined at an angle 33 of about 55° to the basic or primary airfoil's chord.

Note how from within the wing region located between the high speed leading edge of primary airfoil, and its front spar location, or forward end of the wing's torsion box, located at the wing's chord, my double slotted leading edge device unfolds with a practical structure to define an overall rectilinear chord of the auxiliary airfoil of 36% of the primary airfoil's chord, that is, about twice as much as the distance from the leading edge flap of the basic airfoil to its front spar location.

The shape of the nose and upper surface of forward members 7–9 has been most carefully specified to provide minimum speeds and most favourable pressure gradients and curvatures compatible with practical structures. Hence a very large leading edge radius 35 is provided about 3% of the primary airfoil's chord and about 16% of the primary airfoil's thickness.

The upper surfaces of 9 and 7 have from the leading edge radius a smooth curve of continuously increasing radius along and on top of the first, second and third quarters of chord 31. As an indication of the rate of increase of the radius of curvature, there are shown in FIG. 2 certain discreet radius, which are to be taken as representative of geometrically descriptive averages over a portion of the upper surface along the first, second, third and last quarters, rather than surface defining elements, as the curve has a continuously increasing or varying radius over most of its surface. Thus it is seen that along the second quarter of the upper surface of the leading edge radius, there is a surface portion having a radius of curvature 37 of approximately 12% of the airfoil's chord and 66% of its thickness, with a center at 39.

Between the second quarter and the leading edge radius there lies the first quarter, a portion of which has a radius of curvature 37 with a center 39. Radius 37 is approximately 6.5% of the basic airfoil's chord, and about 38% of the basic airfoil's thickness.

Along the third quarter there is a portion having a radius of curvature 45 with center 47; the radius is illustrative of 24% of the primary airfoil's chord and 45% of its thickness.

Finally along its fourth quarter and adjacent its trailing edge, there is a surface portion having a radius of curvature 49 approximately 15% of the basic airfoil's chord, or about equal to the basic airfoil's thickness. 49 has a center at 51. Trailing edge of 7 is spaced from nose of member 3 to provide walls of a slot 53 therebetween, which acts as a forward slot of my double slotted leading edge flap.

With respect to the undersurface of extended elements 7–9, note that I retain the full radius of the articulated nose portion 9 even to the backwardly facing surface portions, because at very high lifts the stagnation point on elements 7–9 can be adjacent the backwardly facing surface portion. The remaining undersurface portion 7–9 is defined to increase the mean camber of 7, as well as to provide retraction space for 9 on top of 7 as shown in FIG. 1. The distribution of cross-sectional area between 7 and 9 for the airfoil of FIGS. 1–2 is meet the above undersurface requirements with the cross-sectional area of 9 being considerably larger than that of 7.

The rate of increase of the radius of curvatures of the upper surface of elements 7–9, described before, in terms of radius of leading edge and radius applicable to portions of first quarter, second quarter, and third quarter, is seen a continuous and approximate doubling of average values such as the following sequence: 17%, 38%, 68% respectively, expressed in of basic airfoil's thickness in this instance.

A sharper curvature is permitted near the trailing edge because of the presence of the "sink" effect of first or upstream slot 53 permits the flow to negotiate sharper turns ahead but near to the slot, to better prepare the tangency of air flowing on top of member 3.

It should be noted in FIG. 2 that center of average curvatures of leading edge radius, and of surface portion along second and fourth quarters lie in a straight line; also, all centers of curvatures lie within a straight band 5 of a width approximately 3% of the primary airfoils's. The band has approximately the same inclination with respect to member 7–9 as it has to the airfoil's chord in the landing disposition.

Figure 3:
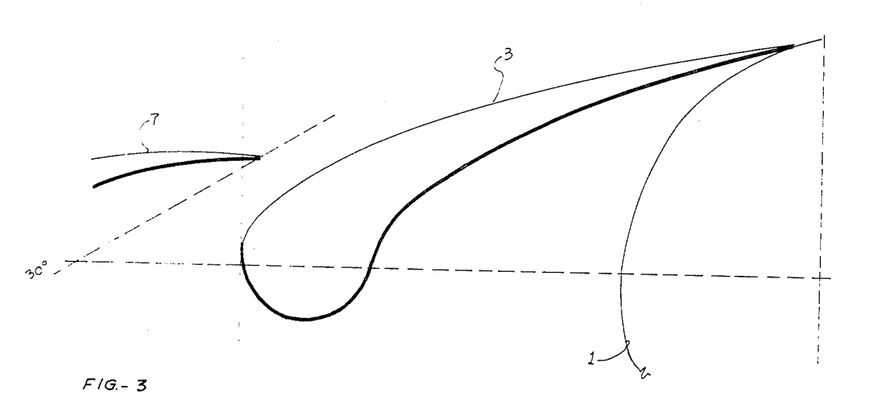
FIG. 3 shows the same airfoil of FIG. 2 in take-off position with one slot, also useful for climb.

FIG. 3 shows a partial view of my double slotted leading edge flap but in a take-off or climb position in which upper member is adapted to be placed at or very near its high speed position, closing slot 19.

Lower member 7–9 is retained extended in a camber increasing chord increasing slotted disposition similar to FIG. 2. In FIG. 3, chord of element 7 is inclined at about 30° to the airfoil's basic chord; element 9 is not shown.

There is considerable difference between the aerodynamics of FIG. 2 and 3.

Firstly, the effective chord of my leading edge device extending between leading edge of 9 and trailing edge 7 at slot has been halved, as there is less requirement on maximum lift in take-off than in landing. Also, number of slots has been halved.

More important, drag has been decreased because of the closure of slot 19 shown in FIG. 2, which evidently eliminates the high speed airflows into slot 19 which increase drag.

The inverted final shape of drawing 3 below element 3 must not be misunderstood as necessarily increasing drag. This cavity has near stagnant flow conditions, hence there is less friction losses within it than if slot 19 were open.

My design of FIGS. 1, 2 and 3 is shown now with necessary changes to adapt it on a medium thick airfoil of 12% thickness in FIG. 4 and 5, described hereinafter.

Figure 4:
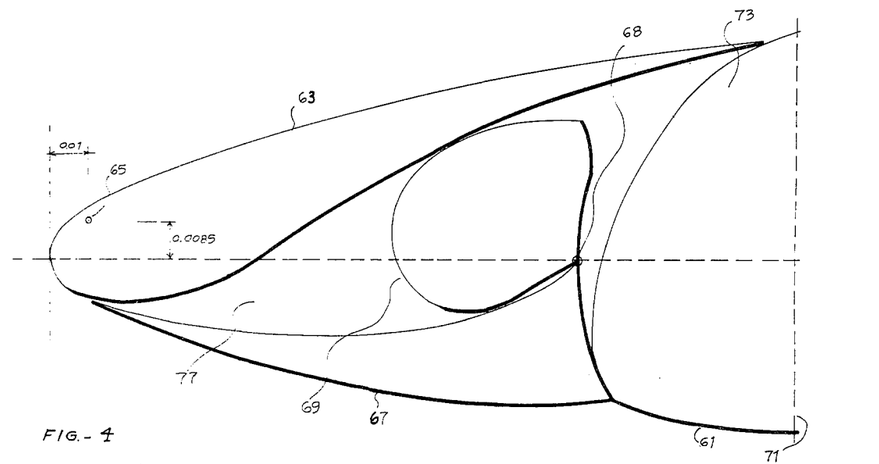
FIGS. 4 and 5 show on the nose of a medium thick airfoil a sectional view of double slotted edge flap in the retracted and in a double slotted high lift positions, respectively.

FIG. 4 shows the nose portion 61 of a 12% thick airfoil on which there is installed retracted my double slotted leading edge flap. Its upper member 63 is shown hinged at axis 65 forming an upper surface leading portion to the basic airfoil. It should be observed that hinge 65 in this embodiment is actually within a circle defined by leading edge circle having a radius dimension of about 0.9% of the chord of the basic airfoil. Lower flap member 67 is also hinged at 5 in this embodiment, although a different axis could be used. Flap member 67 has a folding nose piece 69 of exceptionally large dimension having a crossectional area about equal to that of 67. Nose 69 is folded on top of 67 hinged at 68. Member 67 forms a lower leading surface portion to the basic airfoil. It should be carefully noted how wing spar 71 is located at approximately 19% of the chord of the primary airfoil, leaving very considerable volume 73 to house actuators and controls. It should also be observed that only small space 77 is left unused within the contours of the airfoil' s nose.

Figures 5, 7:
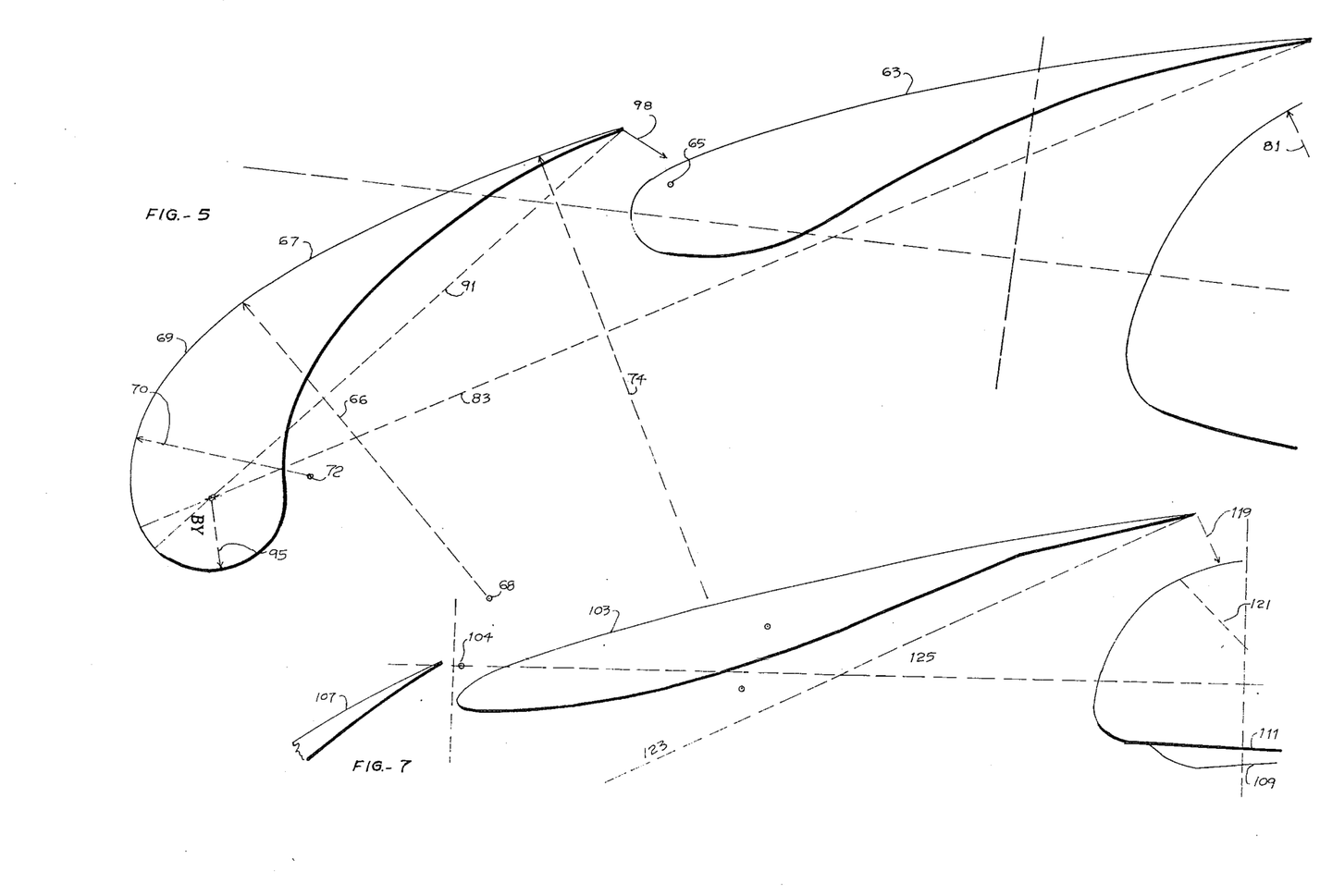

FIG. 5 shows the structure of FIG. 4 deployed in a landing configuration. Upper member 63 is raised upwardly about hinge 65 by a small amount to open a downstream slot 79 at approximately 18% chord of the basic airfoil and on its upper surface. Note that the lower slot wall adjacent the slot mouth has a curvature the radius of curvature of which increases in the downstream direction continuously until it blends with the wing's upper surface contour. A radius of curvature in the region described, which is not to be taken as representative of the variable and increasing radius, but as a value for a surface portion near and ahead of the slot's mouth, is shown as 81 and it is approximately 6.2% of wing chord or about ½ of its basic airfoil thickness. The radius is inclined at 30° from the vertical. The convergence ratio if the downstream slot is excellent and by inspection, in the order of 6 to 1. Note that member 63 does not increase the camber and chord of the basic airfoil.

Lower member 67 is shown in FIG. 5 deployed inverted with respect to its retracted position, extending the camber and chord of the basic airfoil. The nose 9 is also inverted with respect to member 7, placed unfolded extending the camber and chord of member 7.

My extended double slotted leading edge flap has, by inspection, an aerodynamically effective rectilinear chord 83 about 32% of the chord of the basic airfoil, extending between leading edge of 69 and trailing edge of 63 at slot, and inclined at an angle of about 31° to the chord of the basic airfoil.

The upper member 63 has a chord of about 18% of the airfoil's chord and is inclined at an angle of about 23°. The upper surface contours of 63 and its leading edge radius conforms to that of the basic airfoil.

Lower member 67 has a chord 91 of about 16% of the basic airfoil's chord, which is inclined at an angle of about 50° to the basic or primary airfoil's chord.

Note how from within the region included from the high speed leading edge of primary airfoil, and its front spar location at 19% of its chord, my double slotted leading edge device unfolds with a practical structure, to define an overall rectilinear chord of the auxiliary airfoil of 32% chord which is nearly twice as much as the distance from the leading edge flap of the basic airfoil to its front spar location.

The shape of the nose and upper surface of forward members 67–69 has been most carefully specified to provide minimum speeds and most favourable pressure gradients and curvatures compatible with practical structures. Hence a very large leading edge radius 95 is provided about 2% of the primary airfoil's chord, and about 16% of the primary airfoil's thickness.

The upper surfaces of 69 and 67 have from the leading edge radius a smooth curve of continuously increasing radius along and on top of the first, second and third quarters of chord 69–67. As an indication of the rate of increase of the radius of curvature, there are shown in FIG. 5 certain dscreet radius, which are to be taken as representative of geometrically descriptive averages over a portion of the upper surface along the first, second, third and last quarters, rather than as surface defining elements, as the curve has a continuously increasing or varying radius over most of its surface.

Thus it is seen that along the second quarter of the upper surface of the leading edge radius, there is a portion having a radius 66 of curvature, having a center 68, and of approximately 10% of the airfoil's chord and 85% of its thickness.

Between the second quarter and the leading edge radius there lies the first quarter a surface portion of which has a radius of curvature 70 with a center 72. Radius 70 is approximately 4.5% of the basic airfoil's chord, and about 38% of the basic airfoil's thickness.

Along the fouth quarter there is a surface portion having, adjacent the trailing edge, a radius of curvature 74 with a center, and its illustrative of 15% of the primary airfoil's chord, and 125% of its thickness.

The rate of increase of the radius of curvatures described before, in terms of leading edge radius and representative radius for portions of first quarter and second quarter surfaces, is seen a continuous increasing and approximately doubling of average values such as the following sequence: 16%, 38% and 85% respectively, expressed in percent of basic airfoil's thickness in this instance.

A sharper curvature is permitted near the trailing edge because of the presence of the "sink" effect of first or upstream slot 98 permits the flow to negotiate sharper turns ahead of the slot and better prepare the tangency of flow entering on top of member 63.

It should be noted in FIG. 5 that center of curvatures of leading edge radius, and of the first, second and fourth quarters of upper surface portions lie in a straight line; also all centers of curvatures lie within a straight band approximately 3% of the primary airfoil's, and approximately in the same inclination to 67 and 67 has to the airfoil's chord in this slow speed disposition.

My double slotted leading edge flap of FIG. 5 in a take-off position in which upper member is adapted to be placed at or very near its high speed position in an unslotted configuration is not shown but it would be similar to that of FIG. 3, although on certain wing positions, such as near the tips or near nacelles, or at certain high take-off lift coefficients, a double slotted take-off configuration can be used.

My design of FIGS. 1, 2, 3, 4 and 4 is shown now with necessary changes to adapt it on a thin airfoil of 6% thickness in FIGS. 6, 7 and 8 described hereinafter.

FIG. 6 shows the nose portion 101 of a 6% thick airfoil on which there is installed retracted my double slotted leading edge flap. Its upper member 103 is shown hinged at axis 105, forming an upper surface leading portion to the basic airfoil. It should be observed that hinge 105 in this embodiment is at about half of the chord of 103 and section does not tend to open trailing edge 103 away from 101. Leading edge radius of 103 has a dimension of about 0.2% of the chord of the basic airfoil. Lower flap member 107 is hinged at 104 in this embodiment, although a somewhat different axis could be used. Flap member 107 does not have a folding nose piece, but a fixed nose of exceptionally large dimension having a cross-sectional area much larger than that of 103. As a fairing for high speed cruise, there is provided a folding door 109 hinged at 108. Member 107 forms a lower leading surface portion to the basic airfoil. It should be carefully noted how wing spar 111 is located at approximately 20% of the chord of the primary airfoil, leaving very considerable volume 113 to house actuators and controls. It should also be observed that only very small space 117 is left unused within the contours of the airfoil's nose.

FIG. 7 shows the structure of FIG. 6 deployed in a landing configuration. Upper member 103 is raised upwardly about hinge 105 by a small amount to open a downstream slot 119 at approximately 18% chord of the basic airfoil and on its upper surface. Note that the lower slot adjacent the slot mouth has a curvature the radius of curvature of which increases in the downstream direction continuously until it blends with the wing's upper surface contour. A radius of curvature in the region described, which is not to be taken as representative of the variable and increasing radius, but as radius applicable to a surface portion, is shown as 121 and it is approximately 3.9% of wing chord or approximately ⅔ of basic airfoil thickness. At the surface portion shown near and ahead the slot's mouth, the radius is inclined at about 35° from the vertical. The convergence ratio of the downstream slot is excellent and by inspection, extremely large. Note that member 103 does increase the camber, but not the chord, of the basic airfoil.

Lower member 107 is shown deployed inverted with respect to its retracted position, extending the camber and chord of basic airfoil. Folding piece 109 is inverted with respect to member 101 placed unfolded rearwardly.

My extended double slotted leading edge flap has, by inspection, an aerodynamically effective rectilinear chord 123 about 34% of the chord of the basic airfoil extending between leading edge of 107 and trailing edge of 103 at slot 119 and inclined at an angle 125 of about 26.5° to the chord of the basic airfoil.

The upper member 103 has a chord of about 19% of the airfoil's chord and is inclined at an angle about 16°. The upper surface contours of 103 and its leading edge radius conform to that of the basic airfoil.

The lower member 107 has a chord of about 15% of the basic airfoil's chord, inclined at an angle of about 45° to the basic or primary airfoil's chord.

Note how from within the region included from high speed leading edge of primary airfoil, and its spar location at 20% of its chord, my double slotted leading edge device unfolds with a practial structure, to define an overall rectilinear chord of the auxiliary airfoil of 34% of the primary airfoil's chord, that is about twice as much as the distance from the leading edge flap of the basic airfoil to its front spar location, or to the front end of the wing's torsion box.

The shapes of the nose and upper surface of forward member 107 has been most carefully specified to provide minimum speeds and most favourable pressure gradients and curvatures compatible with a practical structure. Hence a very large leading edge radius 135 is provided about 1% of the primary airfoil's chord, and about 16% of the primary airfoil's thickness.

Figures 8, 9:
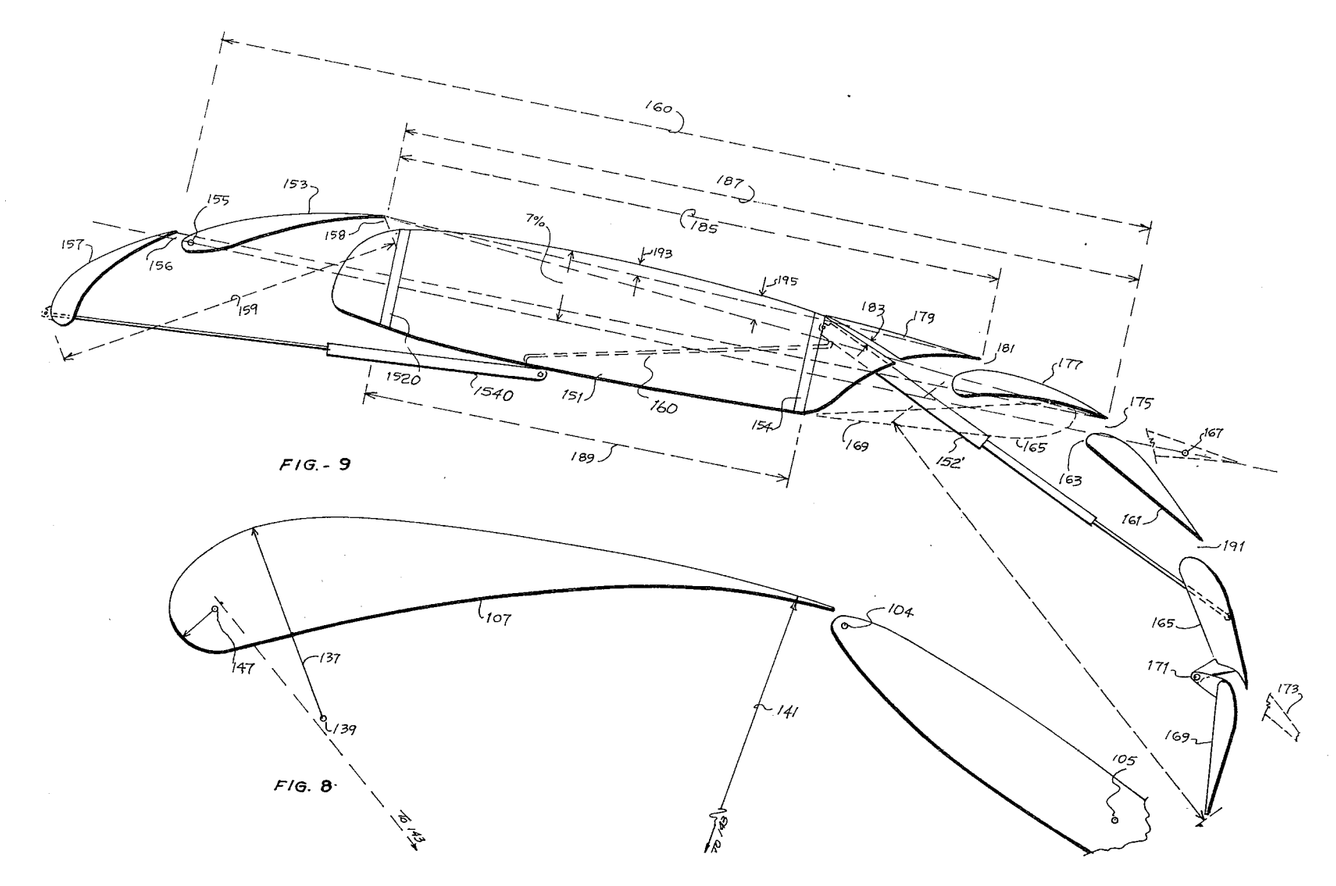
FIG. 8 shows a high lift to drag position of the flap of FIG. 7 with no slots, useful for take-off or climb.
FIG. 9 shows a sectional view of a medium-thick airfoil having a multi-slotted leading and trailing edge flaps, with the airfoil having an upper surface of minimum camber and of minimum chordal length between slots.

As shown in FIG. 8, the upper surfaces of 107 has from the leading edge radius a smooth curve of continuously increasing radius along and on top of the first, second and last quarters of its chord. As an indication of the rate of increase of the radius of curvature, there are shown in FIG. 8 certain discreet radius, which are to be taken as representatives of geometrically descriptive averages over a portion of the upper surface along the first, second, and last quarters, rather than surface defining elements, as the curve has a continuously increasing or varying radius over most of its surface. Thus it is seen that along the second quarter of the upper surface of the leading edge radius, there is a portion having a radius 137 of curvature having a center (not shown) of approximately 19% of the airfoil's chord and three times its thickness.

Between the second quarter and the leading edge radius there lies the first quarter, a portion of which has a radius of curvature 137 with a center 139 (radius 137 is approximately 6% of the basic airfoil's chord, and about 100% of the basic airfoil's thickness).

The rate of increase of the radius of curvatures described before, in terms of leading edge radius, first quarter and second quarter, is seen with a strong increase of values such as the following sequence: 16%, 100% and 300% respectively, expressed in percent of basic airfoil's thickness this instance.

A sharper curvature is permitted near the trailing edge of 107 in order to fair smoothly to the top of 103, having a surface portion with a radius 141 having a center at 143.

It should be noted in FIG. 8 that center 147 of curvature of leading edge radius, and centers of radius of surface portions on the first quarter, and fourth quarter lie approximately in a straight line 145, which is approximately parallel to the chordline of the primary airfoil, and approximately at the same inclination with respect to. 107, as 107 is with respect to 111.

FIG. 8 shows my double slotted leading edge flap in a take-off position in which upper member is adapted to be placed at or very near its high speed position closing slot 119, as well as front slot shown in FIG. 7 between 107 and 103. Lower member 107 is retained extended in FIG. 8 in a camber increasing slotted disposition similar to FIG. 7.

There is considerable difference between the aerodynamics of FIGS. 7 and 8.

Firstly, the effective chord of my leading edge device has been halved, as there is less requirement or maximum lift in take-off than in landing. Also, all slots have been eliminated, such that drag be decreased, because of the closure of slots evidently eliminates the high speed airflows into the slots, which increase skin drag.

SUMMARY FIG. 1–8 AND 9

We can now summarize important characteristics of my double slotted leading edge flap or auxiliary airfoil.

The radius of the nose or leading edge of the deployed lower member of my double slotted leading edge flap is approximately 16% of the thickness of the primary airfoil in all drawings.

Downstream from the leading edge radius along an upper surface portion of the first quarter of the lower member, there is a surface portion on each of my deployed airfoils with a radius of curvature at least as great as approximately 35% of the thickness of the basic airfoil.

For the 12% and 18% thick airfoil, and consequently between these thicknesses, and adjacent to them, on the upper surfaces of the second and last quarters of the lower member, there are portions having radius at least as great as 65% for the second quarter, and about 18% for the last quarter.

There are, in the upper surfaces of my deployed lower members, surface portions in the leading edge region, and in their first and other quarters, with radius of curvature having centers. The locus of centers is such that at least three of them fall approximately in a straight line, or a rectilinear band, inclined to the lower member in the landing position at an angle having a magnitude about equal to that of the angle of inclination of the deployed lower member with respect to the primary airfoil.

When my upper member is in its retracted position, the thickness of its nose position, when measured along a vertical line passing through the center of the leading edge radius of the nose portion and perpendicular to the chord of the primary airfoil, is approximately 60% of the thickness of the primary airfoil in th region where the nose of the retracted lower member is located. for example, that thickness is by inspection for my airfoil of FIG. 1 66%, for my airfoil of FIG. 4 59% and for my airfoil of FIG. 6 it is 63%.

Also, in all drawings the nose of my retracted lower member is between the closed slot walls defined by the rearward face of my upper member and the forwardly face of the primary airfoil.

The upper member of my double slotted leading edge flap has upper surfaces the shape of which match the contours of the primary airfoil.

Near the slot mouth of the downstream and of the upper member there is a lower wall surface adjacent to the front or forwardly of the primary airfoil, with a surface portion having a radius which, when expressed as a fraction of the maximum thickness of the primary airfoil, increases approximately as the thickness decreases, such that it is about ⁻ for 18% thickness, ½ for 12% thickness and ⅔ for 6% thickness. For such surface position, the radius is inclined at about 30° to 40° forwardly of the vertical.

These and other general traits of my design have been mentioned individually in my description of the figures, and also in the claims at the end of the specifications.

My designs of prior figures are shown now on a medium thick airfoil of about 12% thickness in FIG. 9, incorporating also a trailing edge multi-slotted flap of the inverting kind.

FIG. 9 shows a primary airfoil 151 having a fuel volume and wing torsion box between a front spar 1520 and a rear spar 154.

The primary airfoil or wing, has my double slotted leading edge flap with an upper member 153 hinged at 155, and a lower member 157 which increases the chord and camber of 153 and 151.

Two slots are formed by my leading edge device; upstream slot 156 and downstream slot 158, both of which are shown open in the landing disposition.

The aerodynamic chord of my double slotted device is 159, about 32% of the high speed chord 160.

At the trailing edge of 151, I show a special multi-slotted flap arrangement combined with wing and spoiler.

The flap itself comprises vane 161 pivoted at 163 and an inverting member 165 pivoted at 167.

Flap 165 shows a novel and advantageous use of a slotted articulation formed between the thick and thin ends of the inverting member. The thin end is noted as 169. The slot could be a fixed slot approximately as shown in the retracted position. However, 169 is shown articulated at 171 in the landing position. Position 173 can be used to decrease wing lift for change of flight path, or to decrease drag during flap retraction. Finally, element 169 could be made telescopic into 165 in order to increase chord of 165 for high lift and decrease flap drag in the retraction cycle.

With respect to the wing itself, a novel and peculiar arrangement of special cooperation is shown in which a spoiler 179 is mounted ahead of the usual wing-flap slot 175. It should be understood that element 177 is fixed a part of the wing, and that ahead of it, another and unique slot 181, ahead of a conventional flap slot, is formed by raising spoiler slightly by angle 183, by which method slot 181 is located upstream of 175, as close as possible to slot 185. Slot 181 improves flow before it gets to slot 175, thereby permitting larger flap deflection. Also, curvature between 158 and 181 is effectively decreased.

These advantages are better understood as follows:

The distance 185 between 158 and 181 is only about 57% of the chord 160, which is considerably shorter than usual distance 187 to slot 175, which is about 70% chord.

Moreover, by raising 179, effective upper surface camber 193 between slots 158 and 181 is only about 1.2% of chord 160; whereas effective upper surface camber 195 between front slot 158 and usual slot 175 is about twice as much.

Smaller camber and shorter chord between my slots delay and impede flow separation on the wing's upper surface.

Moreover, the combined effects of my double slotted leading edge flap, in particular the rearward location of its downstream slot; and my trailing edge flap design, in particular the forward location of its upstream slot, can be more readily appreciated and understood with the following considerations:

Distance 189 between front and rear members of wing is 40% of chord 160 with continuous torsion box between.

Leading edge effective chord 159 is 33% of chord 160.

Trailing edge effective chord 191 is 45% of chord 160.

Distance 187 between slots 158 and 175 is 70% of chord 160.

Approximate arched length of airfoil all flaps deployed is 33 + 70 + 45 = 148% of chord 160.

Most important, length of upper surface between slots 158 and 181, which no slots in between and virtually no camber, is only 57% of chord 160, that is only about 39% of the total arched length which is 148% of chord 160.

Hence the cambered portions are the remaining highly curved surfaces all of which are either re-energized by local slots, and/or have very thin boundary layers, and/or have specially prescribed surface curvatures and gradients.

In fact, in my design of FIG. 9, slots are so distributed that elements 157, 153, 177, 161, 165 and 169 are all of small chords of the order of 20% of chord of basic airfoil 160, and are favorably benefited by slots 155, 158, 181, 175 and 191.

Yet this design does not use sliding surfaces, does not need large protruding brackets, and is extremely simple from the mechanical and structural view point.

Finally in FIG. 9 I show actuator 1540 for inverting leading flap member 157, and actuator 152' for inverting trailing edge flap member 165.

Air pressure tends to open 165 when extending it.

Air pressure tends to close 157 when extending it.

Therefore air pressure provides energy into actuator 152' which is transformed into an increment of pressure passed on to actuator 1540 by means of connecting line 160.

Therefore, a substantial portion of the pressure energy required to open 157 is provide by work done by air on moving flap 165, and work done by 165 on 152'. This provides for a smaller lighter actuator, and permits an emergency device to open 157.

Figures 10, 11:
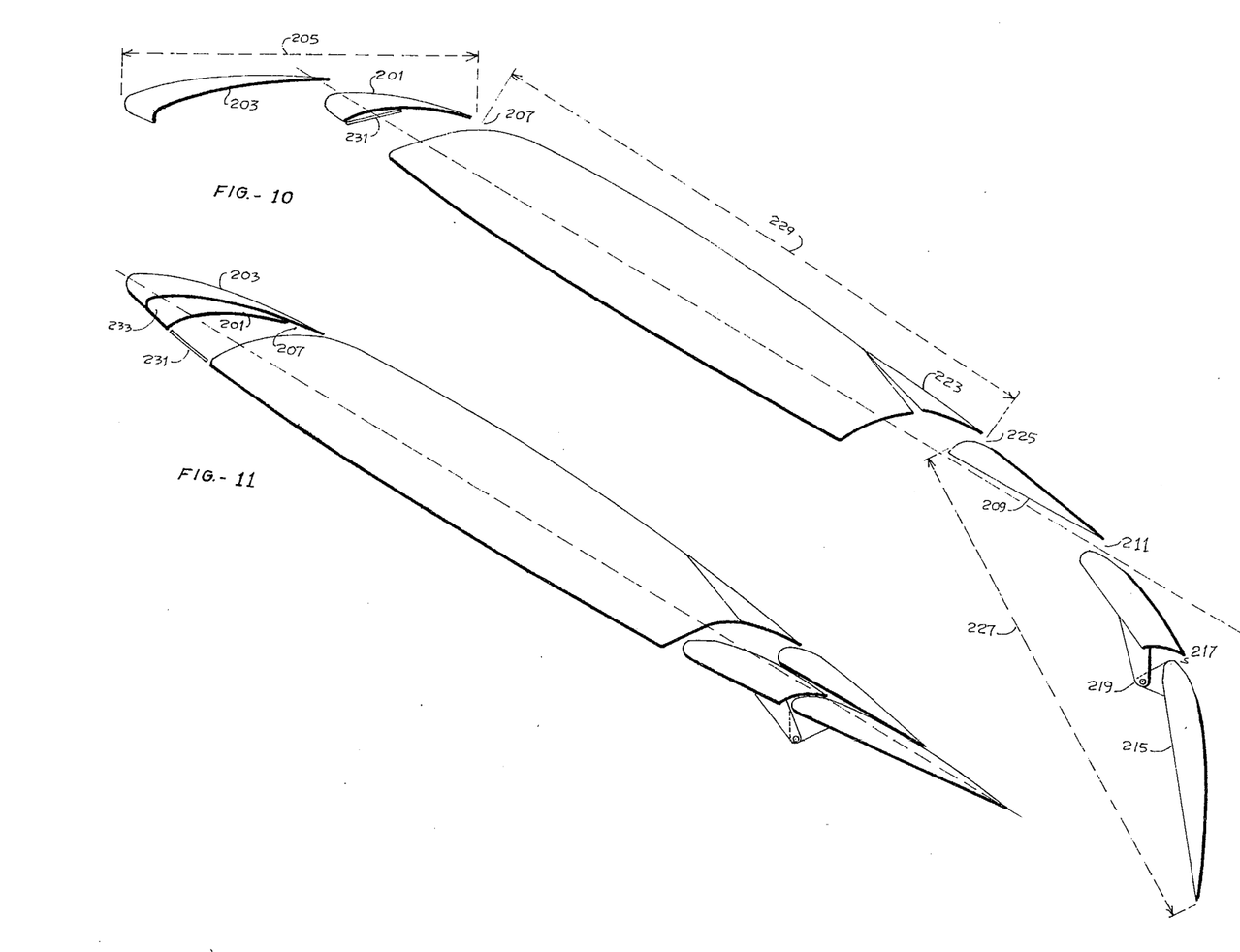
FIG. 10 shows a structure alternate to that of FIG. 9, also in the slow speed position, with a multi-slotted trailing edge flap having an open forwardly located slot upstream of the flap knee and reduced camber on the wing's upper surface, with a multi-slotted leading edge flap with a rearward slot in the open position.

FIGS. 10 and 11

Similar advantages to those mentioned with respect to FIG. 9 are shown in FIG. 10 in alternate embodiments.

A double slotted leading edge flap showing in the extended position a fixed downstream member 201 and a sliding lower member 203 is shown having an effective chord 205 of about 34% of cruise chord. Rear slot 207 is about 17% downstream of cruise leading edge.

At the trailing edge there is shown a peculiar combination of sliding and pivoted flaps. Sliding member is 209 which moves on track rearwardly by about 28% of cruise chord to a slot forming position inclined at about 30° for take-off and landing. Slot 211 is formed between 209 and fixed wing position 213.

Flap member 215 is shown inclined by about 60° for landing position forming a downstream slot 217 with respect to 209 by pivotal motion about 219 with simple small brackets. For take-off 215 is placed in position 221 whereby slot 217 is closed to decrease take-off drag.

A spoiler 223 is provided which when raised by a small angle defines upstream trail slot 225 of the kind described in reference to FIG. 9, located well forward, about 26% of cruise chord, from cruise trailing edge.

Effective trailing flap chord between slot 225 and 215 is about 55% of cruise chord and shown as 227.

Upper wing surface between slots 207 and 225 has a chord 229 of about 58% of cruise chord, which is aerodynamically small as intended, and with virtually no camber, as also intended.

FIG. 11 shows the structure of FIG. 10 in cruise configuration with a simple, neat, and peculiar storage of my trailing elements. At the leading edge, special cooperation is shown in that 203 retracted covers slot 207. A lower door is shown closing intake mouth of slot. Element 201 could be pivoted at 233 if desired to avoid large chord of 203, in which case 201 would work in a way similar to 153 of FIG. 9.

FIG. 12 shows in planform aspects of FIG. 9, inclusive an inboard inverting trailing flap member 165 connected to an outboard flap member by means of line 160.

Also shown in the figure is the use of part span upper leading edge flap member 153 to prevent outboard stall on the swept wing 151, on which portion my double slotted leading edge flap is specially beneficial, as it controls the deterioration effects of spanwise flows within the boundary layer because of the rearward location of the downstream slot of the leading edge flap and the unique oposition of the reinforced boundary layer on both leading edge flap members against spanwise flows.

FIG. 12 also shows how the outboard inverting trailing flap is connected to the inboard inverting leading edge flap member. Finally, in FIG. 12 there is shown connection 16% to equalize and interconnect hydraulic energy imported by inverting trailing edge flap while opening.

I claim:

1. A family of highly cambered double-slotted leading edge flaps for a family of wings having any thickness to chord ratio in which very high lift flows are obtained with reduced adverse pressure gradient, minimized local speeds, and reinforced boundary layer re-energizing along the surfaces of said flap and wing by virtue of the type of curvature and slot relationship embodied in the flap comprising:
    a. a first flap member which in its high lift configuration is an upstream member,
    b. a second flap member which in its high lift configuration is located downstream of said first member,
    c. said leading edge flap members being positioned in a cooperating relationship defining a highly curved double-slotted combined airfoil with a cross-sectional shape relationship defined parametrically,
    d. said combined airfoil having a rounded upstream portion of its upstream member with a radius at least as large as approximately 15% of the maximum thickness of said wing,
    e. with the radius of the curvature of a portion of said upstream member which is located approximately above the geometric center of the radius of curvature of said rounded upstream portion of said upstream member being no greater than approximately 35% of the maximum thickness of said wing.

2. The structure of claim 1 in which:
    a. the first of the two slots of the double-slotted flap is located approximately at the mid-chord of said combined airfoil with said first slot discharging high energy airflow along the upper surface of said second member, and
    b. the second of the two slots of the double-slotted flap is located between the trailing edge of said second member and the forward edge of said wing, with the discharge of said second slot flow combining with a high energy discharge of said first slot and flowing together along the top surface of said wing.

3. The structure of claim 2 in which said second slot is located to the rear of said forward edge of said wing at a distance at least as great as approximately 15% of the distance from said forward edge of said wing and the location on which air from below the structure of said wing meets the airflow on top of the structure of said wing.

4. The structure of claim 1 in which the trailing edge of said second flap member is located substantially to the rear of said forward edge of said wing and is adapted to be restrained from translating forward with respect to said wing with said second member being adapted to be rotated to raise the trailing edge of said second member slightly above the upper surface of the adjacent surface portion of said wing thereby forming converging walls of the second of the two slots of the double-slotted flap.

5. The structure of claim 1 in which an upper surface portion of said upstream member located above the second quarter of the chord of said upstream member has a radius of curvature no greater than approximately 60% of the maximum thickness of said wing.

6. A family of highly cambered 48 double-slotted leading edge flaps for a family of wings having any thickness to chord ratio in which very high lift flows are obtained with reduced adverse pressure gradient, minimized local speeds, and reinforced boundary layer re-energizing along the surfaces of said flap and wing by virture of the type of curvature and slot relationship embodied in the flap comprising:
   a. a first flap member which in its high lift configuration is an upstream member,
   b. a second flap member which in its high lift configuration is located downstream of said first member,
   c. said leading edge flap members being positioned in a cooperating relationship defining a highly curved double-slotted combined airfoil with a cross-sectional shape relationship defined parametrically,
   d. with said first member having a leading edge portion with a radius and a center, and upper surface portions above the second and last quarter of the chord of said first member, each of said surface portions having a radius with a center,
   e. and with the locus of said three centers of said portions of said first member being located in the region adjacent to a straight line of parametric reference, and
   f. said line of parametric reference being located below and approximately parallel to said wing.

7. The structure of claim 6 in which:
   a. the first of the two slots of the double-slotted flap is located approximately at the mid-chord of said combined airfoil with said first slot discharging high energy airflow along the upper surface of said second member, and
   b. the second of the two slots of the double-slotted flap is located between the trailing edge of said second member and the forward edge of said wing, with the discharge of said second slot flow combining with the high energy discharge of said first slot and flowing together along the top surface of said wing.

* * * * *